United States Patent

[11] 3,632,400

| [72] | Inventor | William J. Burlant<br>Detroit, Mich. |
| --- | --- | --- |
| [21] | Appl. No. | 863,394 |
| [22] | Filed | June 30, 1969 |
| [45] | Patented | Jan. 4, 1972 |
| [73] | Assignee | Ford Motor Company<br>Dearborn, Mich.<br>Continuation of application Ser. No.<br>768,944, Aug. 20, 1968, Continuation of<br>application Ser. No. 556,022, June 8, 1966.<br>This application June 30, 1969, Ser. No.<br>863,394 |

[54] SURFACE MODIFIED ELASTOMERS
9 Claims, No Drawings

[52] U.S. Cl. ..................................... 117/93.31,
117/138.8, 117/139
[51] Int. Cl. ..................................... B44d 1/50
[50] Field of Search ............................ 117/62,
93.31, 161 UH, 161 C

[56] References Cited
UNITED STATES PATENTS

| 2,921,006 | 1/1960 | Schmitz et al. | 117/93.31 |
| --- | --- | --- | --- |
| 3,008,920 | 11/1961 | Urchick | 117/93.31 |
| 3,102,103 | 8/1963 | Ahlbrecht et al. | 117/161 UHC |
| 3,188,228 | 6/1965 | Magat et al. | 117/62 |
| 3,188,229 | 6/1965 | Graham | 117/93.31 |
| 3,247,012 | 4/1966 | Burlant | 117/93.31 |
| 3,304,198 | 2/1967 | Woolf | 117/161 UHC |

*Primary Examiner*—Murray Katz
*Attorneys*—John R. Faulkner and Thomas H. Oster

ABSTRACT: An article of manufacture of unique surface properties is produced from an elastomer substrate and a compound represented by the formula

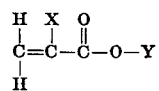

in which X represents a hydrogen atom or a methyl group and Y represents an organic group containing up to eight carbon atoms and at least one carbon-fluorine bond. A film comprising said compound is applied to an exterior surface of the elastomer substrate and polymerized thereon with a beam of electrons having average potential below about 300,000 volts, preferably below 260,000 volts.

SURFACE MODIFIED ELASTOMERS

This application is a continuation of application Ser. No. 768,944 filed Aug. 20, 1968 which in turn is a continuation of application Ser. No. 556,022 filed June 8, 1966.

This invention is concerned with a novel process for applying coatings to commercially available elastomeric materials, and with the coated products so formed. This process in general makes it possible to achieve desired surface properties more economically than heretofore possible. In some cases, it permits formation of coatings that cannot be obtained conveniently by any other known process. The coatings impart to the elastomer improved (a) solvent resistance, (b) abrasion resistance, (c) low coefficient of friction, (d) oxidative stability, (e) thermal stability.

These new coated elastomers are obtained by radiation grafting by means of mildly energetic electrons, fluorine containing compounds derived from acrylic acid to the surface of commercial elastomers such as natural rubber, polyisoprene, styrene-butadiene rubber, neoprene and Buna-n. This process also is effective on rubbers heretofore very difficult to graft such as ethylene-propylene (called EP rubbers) rubbers) and ethylene-propylene containing a few percent of an unsaturated material (called EPT rubbers). It also is possible to coat heterogeneous polymers such as Teflon-filled EP or EPT rubbers, thus making available an even broader range of coated materials. The fluorine containing acrylic acid derivatives may be represented by the following generic formula

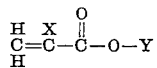

in which X represents a hydrogen atom or methyl group and Y represents an organic group containing up to eight carbon atoms and at least one carbon-fluorine bond. The fluorine containing acrylic derivatives may be used individually or in conjunction with other fluorine containing acrylic acid derivatives. These monomers may be employed per se, or they may be mixed with acrylic acid, methacrylic acid, ethylene dimethacrylate, or admixtures of these substances. Solvents such as pentane, acetone or water further increase the flexibility of this process. By varying the relative amount of fluorine, its location and distribution on the monomer molecule, the relative amount of nonfluorinated monomer, and the relative amount of solvent, it is possible to vary the hardness of the coating over a wide range from an extremely thin one exhibiting the hardness of the base rubber, to coating measurably harder than the base rubber. Adjustment of the solvent and monomer concentrations permits varying thickness of and properties of coatings, since relative concentrations of these components can be varied to alter the penetrability of the mixture into the elastomer.

An important part of this invention is the discovery that the thickness of the coated product can be altered significantly by adjusting the potential of the energetic electrons employed to initiate the grafting step, and by correlating said potential with penetrability of the electrons into the rubber. It has been discovered that the novel coated elastomers with desirable properties described in this disclosure can be obtained by establishing essentially uniform polymerization rates throughout the film, and this can be achieved by using mildly energetic electrons which possess the required penetrabilities for efficient and uniform cure of said coatings, and further, correlating the distance between film and emitting means with the potential of the electron beam. By this method substantial uniformity of polymerization with depth can be achieved for coatings of varying thickness at a dose rate compatible with rapid cures at or near room temperature.

The term "mildly energetic electrons" as employed herein refers to electrons having an average potential of below about 300,000 volts, and of sufficient intensity to polymerize the fluorine containing acrylic acid derivatives employed in the present invention. For most embodiments a potential of about 100,000 to about 300,000 volts at intensities (or dose rates) in the range of about 0.01 to about 15 M.rad/sec. have been found suitable.

A successful graft has been obtained by wiping a thin film of 1,1-dihydroheptafluorobutyl acrylate on a rubber surface and irradiating the rubber surface so coated. This technique permits rapid evaporation of the monomer and so most of the monomer is lost from the surface before polymerization is initiated. However, a polymerized layer about 0.0002 inches thick has been obtained on the surface of the rubber.

An alternate technique to avoid this evaporative loss requires the enclosure of the rubber base and elastomer coating in a protective wrapper. A sheet of 0.015-inch thick aluminum foil has been used for this purpose, although it is apparent that any vapor impervious and radiation pervious material may be used. The amount of 1,1-dihydroheptafluorobutyl acrylate required in this manner to form a graft 0.002 inch thick is about 0.03 grams per square inch of surface to be treated. With certain elastomers it may be necessary to roughen the surface to increase the surface area. This may be accomplished by a light sanding operation.

After a uniform film of 1,1-dihydroheptafluorobutyl acrylate has been established on the elastomer surface, polymerization is initiated with a relatively low-energy electron beam. The preferred voltage range is from 0.15 to 0.30 Mev. The details of a convenient irradiation procedure are presented below as table 1.

TABLE 1

[Irradiation conditions for synthesis of poly (1,1-dihydroheptafluorobutyl acrylate)-rubber grafts; 0.26 mev. electrons]

| Elastomer | Dose rate, Mrad/pass | Total dose, Mrad | Fraction of initially formed graft remaining after 49 hr. benzotrifluoride extraction |
|---|---|---|---|
| Natural rubber | 0.175 | 8.75 | 0.97 |
| Isoprene | 0.175 | 8.75 | 1.00 |
| Neoprene | 0.790 | 15.80 | 0.95 |
| SBR | 0.790 | 15.80 | 0.88 |
| Buna-N | 0.790 | 15.80 | 0.90 |

An improved surface graft has been obtained by copolymerizing 1,1-dihydroheptafluorobutyl acrylate and with either acrylic acid, methacrylic acid or ethylene dimethacrylate or mixtures of these monomers. These expedients result in a particularly tough, solvent resistant and low-friction surface. The excellent frictional properties obtained by copolymerization of 1,1-dihydroheptafluorobutyl acrylate and acrylic acid, methacrylic acid or ethylene dimethacrylate are depicted infra in table 2. These results were obtained with 20 percent acrylic acid and 80 percent 1,1-dihydroheptafluorobutyl acrylate monomers.

TABLE 2

Coefficients of Friction of Poly (1,1-dihydroheptafluorobutyl acrylate acrylic-acid)—Rubber Grafts[a]

| | Coefficient of Friction, $\mu$ | | | | | |
|---|---|---|---|---|---|---|
| | SBR | | Neoprene | | Buna-n | |
| | 1 hr. | 15 hr. | 1 hr. | 15 hr. | 1 hr. | 15 hr. |
| Normal load, 210 g. | | | | | | |
| Treated | 0.50 | 0.68 | 0.44 | 0.58 | 0.77 | 0.73 |
| Untreated | 5.20 | 3.10 | 1.32 | 1.86 | 3.10 | 0.94 |
| Normal load, 1,200 g. | | | | | | |
| Treated | 0.48 | 0.58 | 0.57 | 0.57 | 0.63 | 0.51 |
| Untreated | 1.60 | 1.35 | 1.24 | 1.38 | 1.40 | 0.63 |

[a] All samples were given 22.0 Mrad with 0.26 Mev electrons at 5.5 Mrad/pass.

The improved ozone resistance of rubber to which has been grafted a layer of poly 1,1-dihydroheptafluorobutyl acrylate is presented herewith as table 3.

TABLE 3

Ozone Resistance of Poly (1,1-dihydroheptafluorobutyl acrylate)—Rubber Grafts

| Elastomer | | Time of Exposure at 100° F. to 35 ± 5 Parts of Ozone Per hundred Million of Air | | | |
|---|---|---|---|---|---|
| | | 4 hr. | 6.5 hr. | 22.5 hr. | 48 hr. |
| Isoprene | Untreated | 2 | 2 | 3 | 3 |
| | Treated | a | a | b | c |
| Natural Rubber | untreated | 2 | 2 | 3 | 3 |
| | treated | a | a | b | c |
| SBR | untreated | 2 | 2 | 3 | 3 |
| | treated | a | a | b | c |
| Neoprene | untreated | 0 | 0 | 0 | 0 |
| | treated | a | a | a | a |
| Buna-n | untreated | 2 | 2 | 3 | 3 |
| | treated | a | a | b | c |

0: No checking or cracking.
1: Small cracks visible only at 2× magnification.
2: Small cracks or checks visible with 1×magnification.
3: Small to medium size checks or cracks.
a: Small areas show localized ozone attack, but 95% of surface area is unaffected.
b: Small areas have enlarged slightly, but 90% of surface area remains unaffected.
c: Small attacked areas have enlarged to the point where they must be classified as failures, but large areas of treated surface remain unaffected.

The excellent solvent resistance of the coated elastomers is shown in table 4. In this table the angle indicated is the angle between the surface of the substrate and a line tangent to a drop of solvent resting upon the substrate at the point the substrate intersects the drop.

TABLE 4
[Solvent resistance of poly (1,1-dihydroheptafluorobutyl acrylate)-rubber grafts]

| Elastomer | | Contact angles, degrees | | | | Automatic transmission fluid (4 days) | Automatic brake fluid (7 days) |
|---|---|---|---|---|---|---|---|
| | | ASTM #3 oil (72 hr.) | Plexol 201 (72 hr.) | Hexadecane (72 hr.) | Toluene (0.5 min.) | | |
| Natural gum rubber surface | Modified | 71.3 | 66.0 | 61.5 | 63.0 | 59.3 | 23.8 |
| | Untreated | (¹) | (¹) | (¹) | (¹) | (¹) | ~5 |
| Polyisoprene | Modified | 76.5 | 66.7 | | | 60.3 | |
| | Untreated | (¹) | (¹) | | | (¹) | |
| SBR | Modified | 75.8 | 62.8 | 66.0 | 63.5 | 58.3 | 24.0 |
| | Untreated | (¹) | (¹) | (¹) | ~20 swells | <5, swells | ~5.0 |
| Neoprene | Modified | 67.5 | 61.8 | 65.0 | 56.5 | 57.5 | 56.8 |
| | Untreated | <25, swells | (¹) | <10 | <10, swells | 33.0 | 20.0 |
| Buna-N | Modified | 66.5 | 65.7 | 66.5 | 60 0 | 56.8 | 34.3 |
| | Untreated | 25-30 | 25-30 | <15 | <15, swells | 20.0 | 60, swells |

¹ Pronounced swelling.

The experiment described in table 4 in which a coated and foil enclosed rubber base was provided with a surface graft has been modified as follows.

Buna-n rubber was used as the elastomer and was coated with perfluorooctyl acrylate. The radiation energy was 150,000 volts, the dosage was 50 M.rad and a product resulted having a coefficient of friction against metal of 0.72. The tensile strength of the product was not altered by the radiation-grafting process; however, if 260,000 volt electrons are employed in place of the 150,000 volt electrons used, the tensile strength decreases to 66 percent of that of the untreated blank as shown in table 5.

TABLE 5

| Rubber | Electron energy, volts | Mechanical Property Change | |
|---|---|---|---|
| | | Tensile Strength | Elong. at Break |
| 1. Styrene-butadiene | 260,000 | −40 | −35 |
| Styrene-butadiene | 150,000 | 0 | 0 |
| 2. Neoprene | 260,000 | −25 | −20 |
| Neoprene | 150,000 | 0 | 0 |
| 3. Buna-n | 260,000 | −34 | −42 |
| Buna-n | 150,000 | 0 | 0 |

The substitution of perfluorooctyl methacrylate for the perfluorooctyl acrylate gave a coefficient of friction against metal of only 0.36.

A mixture comprised of 20 percent 1,1-dihydroheptafluorobutyl acrylate in acrylic acid was dissolved in pentane to give a solution, the total monomer concentration of which was 50 percent. This solution was wiped on an ethylene-propylene rubber sample, the whole enclosed in a nitrogen-filled polyethylene bag to minimize evaporation and decrease the oxygen concentration, and irradiated to a total dose of 27 M.rad with 150,000 volt electrons. The coefficient of friction of the product was 0.2; the coefficient of friction of an untreated sample, 2.0.

Using ethylene-propylene rubber filled with Teflon powder, surface grafts were made as described in the preceding paragraph, except that the solvent was 66 percent acetone water mixture. The coefficient of friction dropped from 2.0 to 0.2. In this case grafting additionally improves the normally poor solvent resistance of ethylene-propylene rubber.

What is claimed is:

1. An article of manufacture comprising in combination an elastomer substrate and a coating on an exterior surface thereof comprising the in situ formed polymerization product of a compound represented by the formula

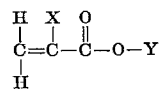

in which X represents a hydrogen atom or a methyl group and Y represents an organic group containing up to eight carbon atoms and at least one carbon-fluorine bond crosslinked on said surface with an electron beam having an average potential above about 100,000 volts and below about 300,000 volts.

2. An article of manufacture in accordance with claim 1 wherein said compound is 1,1-dihydroheptafluorobutyl acrylate.

3. An article of manufacture in accordance with claim 1 wherein said compound is perfluorooctyl acrylate.

4. An article of manufacture in accordance with claim 1 wherein said compound is perfluorooctyl methacrylate.

5. An article of manufacture in accordance with claim 1 wherein said elastomer substrate is ethylene-propylene rubber.

6. An article of manufacture in accordance with claim 1 wherein said elastomer substrate is polytetrafluorethylene-filled ethylene-propylene rubber.

7. An article of manufacture in accordance with claim 1 wherein said electron beam has an average potential not substantially above about 150,000 volts.

8. An article of manufacture comprising in combination an elastomer substrate and a coating on an exterior surface thereof consisting essentially of the in situ formed polymerization product of a monomeric solution of a. about 20 to about 80 percent of a compound represented by the formula

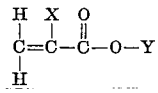

in which X represents a hydrogen atom or methyl group and Y represents an organic group containing up to eight carbon atoms and at least one carbonfluorine bond, and b. about 80 to about 20 percent of a compound represented by the formula

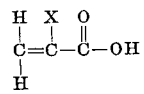

in which X represents a hydrogen atom or a methyl group crosslinked on said surface with an electron beam having average potential above about 100,000 volts and below about 260,000 volts.

9. An article of manufacture in accordance with claim 8 wherein said beam has average potential not substantially above 150,000 volts.

* * * * *